(12) United States Patent
Miller et al.

(10) Patent No.: US 8,544,173 B2
(45) Date of Patent: Oct. 1, 2013

(54) TURBINE NOZZLE BIFORM REPAIR

(75) Inventors: Matthew Nicklus Miller, Maineville, OH (US); David Edwin Budinger, Loveland, OH (US); Marek M. Steplewski, Mission, TX (US); Wayne Ray Grady, Hamilton, OH (US); Robert Ingram Ackerman, West Chester, OH (US); Cary Michael Kinder, Franklin, OH (US); Ian Craig Linscott, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 427 days.

(21) Appl. No.: 12/871,084

(22) Filed: Aug. 30, 2010

(65) Prior Publication Data

US 2012/0047734 A1   Mar. 1, 2012

(51) Int. Cl.
*B23P 6/00* (2006.01)

(52) U.S. Cl.
USPC ............... 29/889.1; 29/888.021; 415/209.3

(58) Field of Classification Search
USPC .............. 415/209.1–209.4; 29/889, 889.1, 29/889.2, 889.22, 889.23, 1
See application file for complete search history.

(56) References Cited

U.S. PATENT DOCUMENTS

| | | | | | |
|---|---|---|---|---|---|
| 2,656,146 | A | * | 10/1953 | Sollinger | 416/92 |
| 3,365,173 | A | * | 1/1968 | Lynch et al. | 415/209.3 |
| 4,097,276 | A | * | 6/1978 | Six | 419/8 |
| 4,687,413 | A | * | 8/1987 | Prario | 415/190 |
| 4,776,764 | A | * | 10/1988 | Ortolano | 416/196 R |
| 5,248,240 | A | | 9/1993 | Correia | |
| 5,269,057 | A | * | 12/1993 | Mendham | 29/889.1 |
| 5,332,360 | A | | 7/1994 | Correia et al. | |
| 5,399,069 | A | * | 3/1995 | Marey et al. | 415/209.3 |
| 5,411,370 | A | * | 5/1995 | Varsik | 415/209.4 |
| 5,536,145 | A | * | 7/1996 | Vandendriessche | 416/213 R |
| 5,690,469 | A | * | 11/1997 | Deal et al. | 415/189 |
| 5,765,993 | A | * | 6/1998 | Weiss | 415/209.2 |
| 5,797,725 | A | | 8/1998 | Rhodes | |
| 6,409,472 | B1 | * | 6/2002 | McMahon et al. | 415/189 |
| 6,416,278 | B1 | | 7/2002 | Caddell et al. | |
| 6,595,747 | B2 | * | 7/2003 | Bos | 415/209.4 |
| 6,793,457 | B2 | * | 9/2004 | Caddell et al. | 415/209.4 |
| 6,884,026 | B2 | * | 4/2005 | Glynn et al. | 415/173.1 |
| 6,905,308 | B2 | | 6/2005 | Hagle et al. | |
| 7,185,433 | B2 | | 3/2007 | Miller et al. | |
| 7,434,313 | B2 | | 10/2008 | Dasilva et al. | |
| 8,210,807 | B2 | | 7/2012 | Long | |
| 8,220,150 | B2 | | 7/2012 | Pellet et al. | |
| 2003/0106215 | A1 | | 6/2003 | Heyward et al. | |
| 2004/0096322 | A1 | * | 5/2004 | Caddell et al. | 415/210.1 |
| 2009/0169395 | A1 | * | 7/2009 | Wilson et al. | 416/97 R |
| 2009/0193657 | A1 | * | 8/2009 | Wilson et al. | 29/889.721 |

\* cited by examiner

*Primary Examiner* — David Bryant
*Assistant Examiner* — Jacob Cigna
(74) *Attorney, Agent, or Firm* — General Electric Company; David J. Clement; Matthew P. Hayden

(57) ABSTRACT

A turbine nozzle may be repaired by severing the inner band from the vanes and outer band, which may then be discarded. A replacement nozzle is cast to include replacement vanes extending between a replacement outer band and an inner web, with the replacement outer band and vanes conforming with the original outer band and vanes. The new web is configured differently than the old inner band and includes a tie bar. The inner band is machined to form vane seats. The web is machined to form plinths atop the tie bar at each of the replacement vanes. The plinths and tie bar are assembled through the vane seats and bonded to the machined inner band to collectively form the repaired turbine nozzle.

19 Claims, 8 Drawing Sheets

TURBINE NOZZLE BIFORM REPAIR

BACKGROUND OF THE INVENTION

The present invention relates generally to gas turbine engines, and, more specifically, to turbine nozzle repair thereof.

In a gas turbine engine, air is pressurized in a compressor and mixed with fuel in a combustor to generate hot combustion gases which are discharged through a turbine for extracting energy therefrom.

The turbine typically includes multiple stages having a stationary turbine nozzle preferentially directing the combustion gases through a downstream row of rotor blades.

Each turbine nozzle includes a row of turbine stator vanes integrally joined to radially outer and inner bands. The bands are typically segmented circumferentially with one or more vanes per nozzle segment.

Since the nozzle segments are directly exposed to hot combustion gases during operation, they are typically formed of cobalt or nickel based superalloy metal for ensuring a long useful life. The superalloy is typically cast using advanced casting processes that control the metallurgical properties of the material, including directionally solidified or single crystal compositions.

Additional protection may be provided by coating the nozzle for corrosion resistance and thermal insulation. And, the nozzle typically includes dedicated cooling circuits using cooling air bled from the compressor.

Nevertheless, during prolonged use in the gas turbine engine the nozzles will oxidize, corrode, crack, or otherwise wear, and are therefore subject to periodic maintenance inspections to discover the onset of such wear and perform remedial repair as warranted.

Maintenance repair may include the complete replacement of worn nozzle segments by new segments, or the repair of portions thereof for minimizing maintenance costs. Because nozzle segments are complex in design, are made of expensive materials, and are expensive to manufacture, it is generally more desirable to repair them whenever possible instead of replacing them.

Existing repair processes include techniques such as crack repair and dimensional restoration of airfoil surfaces. However, such existing repairs are limited by local distortion and under-minimum wall thicknesses, which can be exceeded as a result of repeated repair and chemical stripping processes.

Thus, nozzle segments may become damaged to the point where they cannot be repaired by known repair processes. The thermal and mechanical stresses in integrally cast nozzle segments are such that it often occurs that the inner band is repairable while other nozzle segment structure is non-repairable.

Accordingly, it would be desirable to have a method for salvaging the repairable portion of the nozzle segment to avoid scrapping the entire nozzle segment in such a situation.

BRIEF DESCRIPTION OF THE INVENTION

A turbine nozzle may be repaired by severing the inner band from the vanes and outer band, which may then be discarded. A replacement nozzle is cast to include replacement vanes extending between a replacement outer band and an inner web, with the replacement outer band and vanes conforming with the original outer band and vanes. The new web is configured differently than the old inner band to include a tie bar. The inner band is machined to form vane seats. The web is machined to form plinths atop the tie bar at each of the replacement vanes. The plinths and tie bar are assembled through the vane seats and bonded to the machined inner band to collectively form the repaired turbine nozzle.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
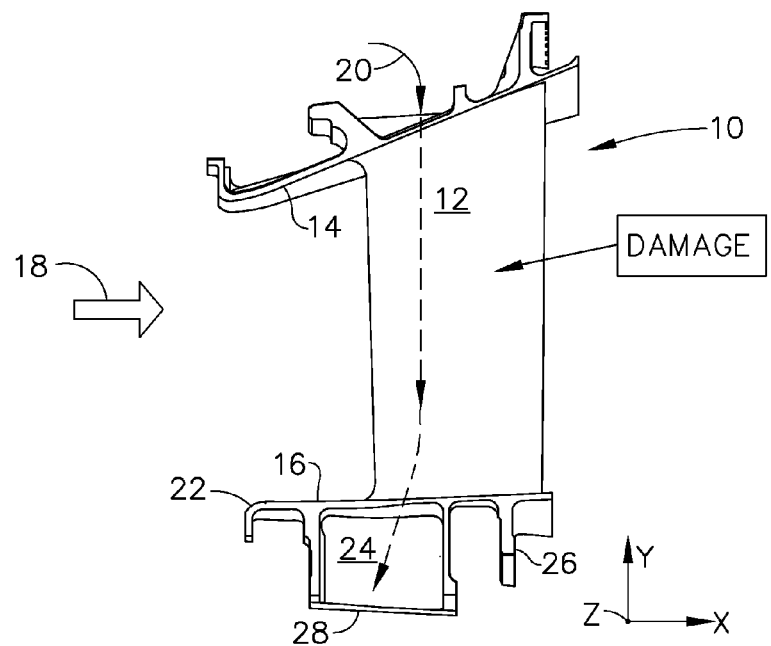
FIG. 1 is an axial view of an exemplary turbine nozzle configured for the first stage of a low pressure turbine.

Illustrated in axial elevational view in FIG. 1 is an exemplary first stage turbine nozzle 10 for a low pressure turbine in a gas turbine, or turbofan, engine. The nozzle 10 is axisymmetrical about a longitudinal or axial centerline axis and is an annular assembly of discrete nozzle segments.

The nozzle includes a row of stator nozzle vanes 12 extending radially between radially outer and inner arcuate bands 14, 16. During operation, hot combustion gases 18 are discharged from a combustor (not shown) and suitably channeled downstream through the nozzle 10.

The nozzle 10 is typically hollow and includes conventional cooling circuits through which cooling air 20 is suitably bled from the compressor (not shown) in the engine.

Both outer and inner bands 14, 16 have inboard flow surfaces between which the hot combustion gases flow during operation. The nozzle vanes 12 smoothly join the inboard flow surfaces at arcuate fillets to maximize turbine efficiency.

In the exemplary embodiment illustrated in FIG. 1, the forward end of the inner band 16 includes a bullnose lip 22, and extending radially inwardly from the underside of the inner band is a plenum box 24 and a radial flange 26 spaced axially aft therefrom.

Figure 2:
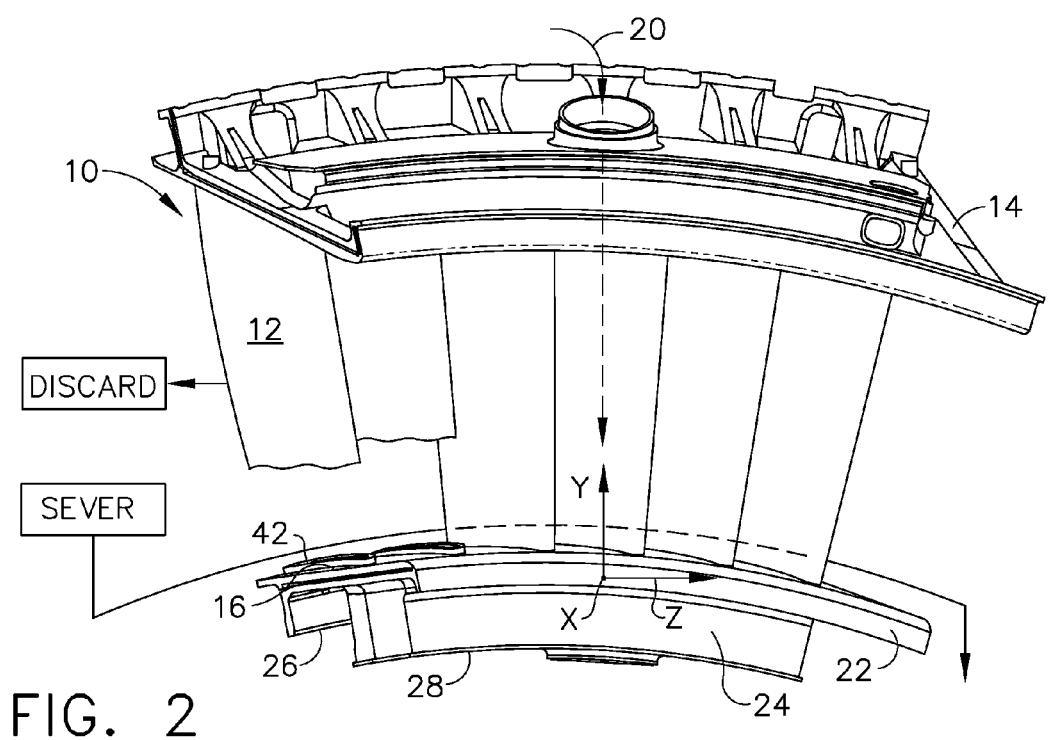
FIG. 2 is an isometric view of an exemplary nozzle segment requiring repair.

As additionally shown in FIG. 2, the plenum box 24 extends circumferentially over the arcuate extent or length of the nozzle segment, and is suitably covered by a sheet-metal cover 28. The exemplary cooling circuit extends radially through the hollow vanes are 12, with the cooling air being supplied through the outer band and discharged into the plenum box 24 below the inner band during operation.

As indicated above in the Background section, the turbine nozzle 10 may operate for a long time in a gas turbine engine and is subject to wear or damage thereto. During a periodic maintenance inspection, various forms of the damage or wear may be discovered that require suitable repair of the original turbine nozzle 10.

It is possible that the original nozzle 10 might be repaired several times during different maintenance outages for the engine over a long useful life. However, since the nozzle segment is formed of several components, some of those components may no longer be repairable due to the extent of accumulated wear or damage thereto.

For example, the row of nozzle vanes 12 and the adjoining outer band 14 may no longer be repairable, while the inner band 16 may have additional life for use in the engine. As indicated above, such turbine nozzles are complex and expensive assemblies of components and the ability to use all those components for their maximum lives decreases the overall expense of purchasing, operating, and maintaining the gas turbine engine.

An improved repair method permits the retention of the original inner band 16 while discarding only the worn vanes 12 and outer band 14 in a repaired turbine nozzle.

As initially shown in FIG. 2, the original inner band 16 is suitably cut or severed from the original nozzle vanes 12 and the attached original outer band 14 in the original turbine nozzle 10 after prolonged use thereof in the gas turbine engine.

Since the original vanes 12 and outer band 14 are no longer repairable themselves due to prolonged use and wear in the engine, they may then be discarded or scrapped.

However, in order to reuse the used inner band 16, the inner band itself must undergo suitable processing so that it may be accurately assembled into a new or replacement turbine nozzle having substantially identical configuration and dimensions as the original or used nozzle being repaired and replaced in part.

Figure 3:
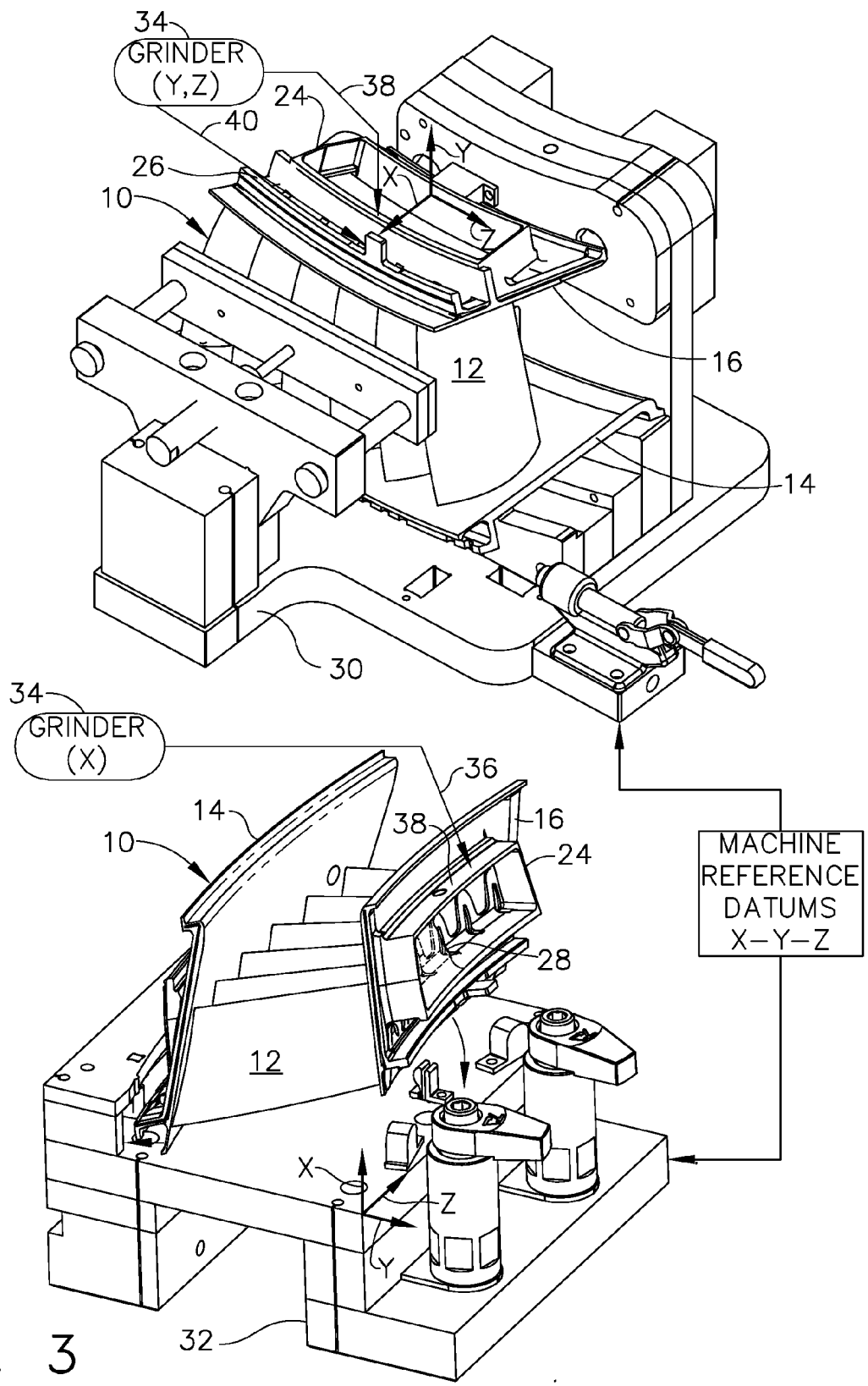
FIG. 3 is a flowchart illustrating initial repair features of the original nozzle segment.

FIG. 3 illustrates preliminary procedures for initially preparing the used turbine nozzle 10 for undergoing repair.

The used nozzle 10 is preferably conventionally processed to remove any corrosion or thermal insulation coatings thereon, and the original box cover 28 is suitably removed to expose the underlying plenum box 24.

The original nozzle 10 has a complex three dimensional (3D) configuration in a typical three coordinate reference system, X-Y-Z. The 3D nozzle segment 10 may be initially mounted in suitable first and second tools or fixtures 30,32 to undergo initial machining in suitable computer numerical control (CNC) machines 34 typically having multiple axes of operation as required.

For example, the machines 34 may be conventional precision grinders that permit precision machine grinding of the original nozzle for the repair procedure.

The original nozzle 10 is initially premachined to create three suitable reference surfaces or datums 36,38,40 in the original inner band 16.

These datums are introduced into the inner band 16 itself since it is being retained for the repaired nozzle, and may include a radial Y-datum 40 under the inner band, an axial X-datum 36 disposed perpendicular thereto, and a circumferential Z-datum 40 circumferentially bridging the original vanes.

For example, since the plenum box 24 extends below the inner band 16 and includes four perimeter walls covering the axial and circumferential boundaries of the inner band, portions of that existing box may be used to advantage to precisely reference the complex 3D contours of the inner band 16 and original placement of the vanes 12 therein.

Since the plenum cover 28 has been removed, the box 24 can be machined to create an accurate radial Y-datum surface 38 along any portion or all of the perimeter thereof along the exposed radially inner edges.

The radial Y-datum 38 may then be machined along the exposed perimeter of the box, and the axial X-datum 36 may be machined along the forward surface of the forward wall of the plenum box 24.

Since the existing radial flange 26 includes a conventional anti-rotating tab extending radially inwardly therefrom, that tab may be accurately machined to define the circumferential Z-datum surface 40.

In this way, original features of the original inner band 16 can be used to precisely define three reference datums 36,38, 40 for subsequent use in the repair process. And since these features are located below the inboard flow surface of the inner band, they provide extra material that can be machined without adversely affecting nozzle performance.

Figure 4:
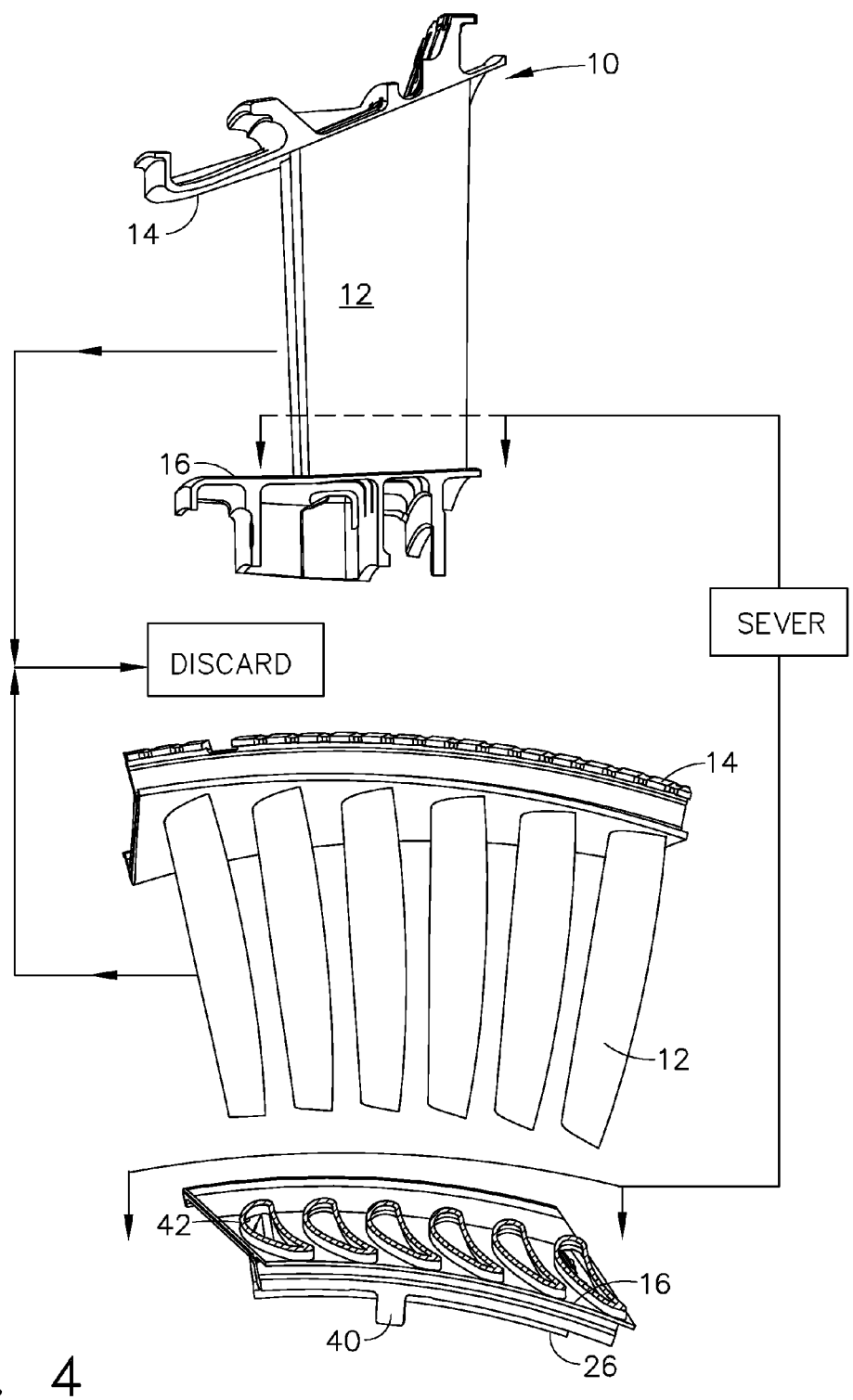
FIG. 4 is a flowchart illustrating removal of the original inner band from the nozzle segment.

As shown in FIG. 4, the inner band 16 is suitably severed or liberated from the original vanes 12 by using any conventional cutting machine that need not require precision and can leave behind rough cut vane stubs 42 top the inboard flow surface of the inner band 16. The vanes can be cut as close as practical to their junctions with the inner band, in the fillet region therebetween, to minimize size of the remaining stubs.

Figure 5:
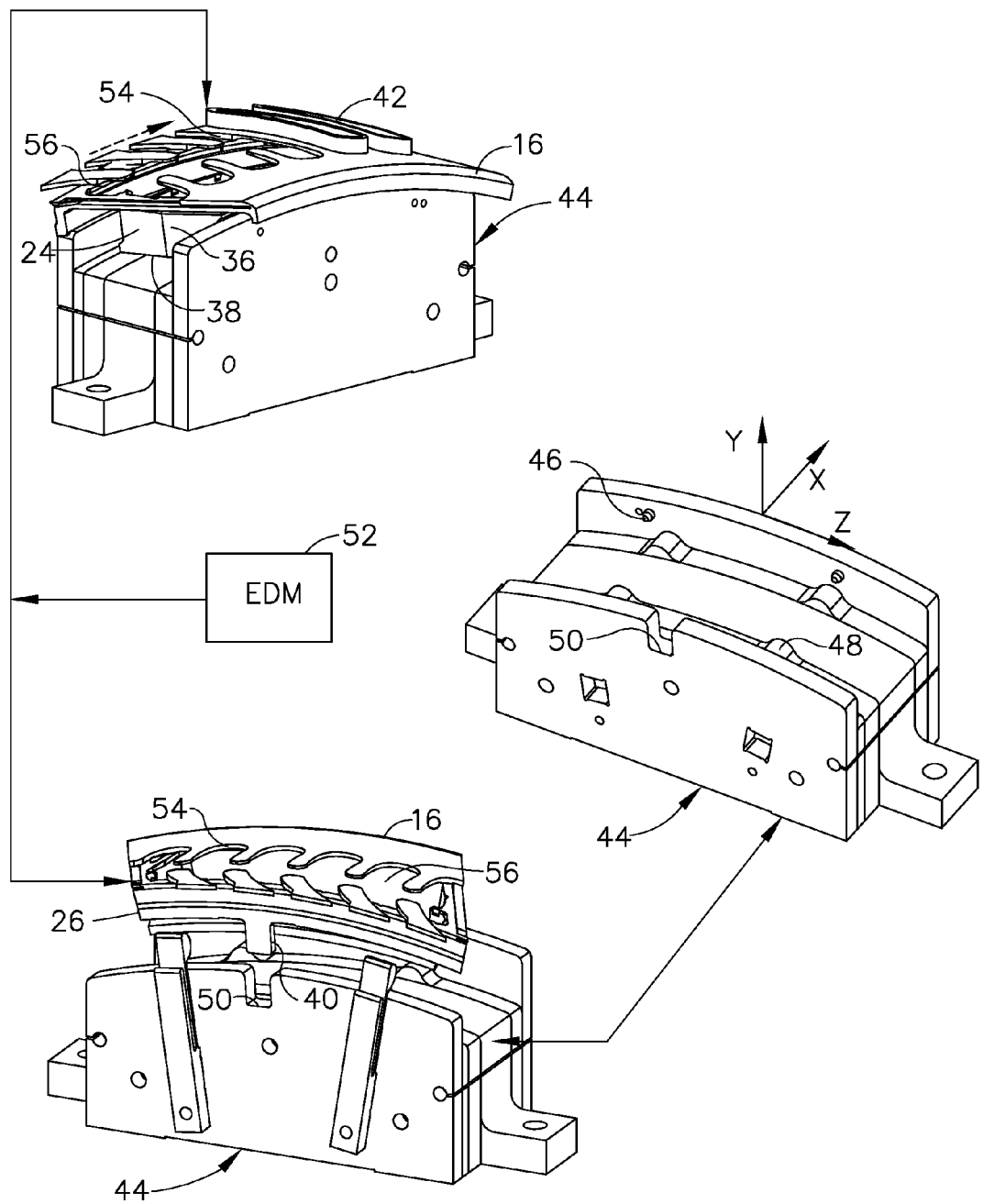
FIG. 5 is a flowchart illustrating machining of the removed inner band in the repair process.

As shown in FIG. 5, the severed inner band 16 may then be mounted in a third tool or fixture 44 specifically configured therefor.

The third tool 44 includes an arcuate cradle to match the arcuate profile of the inner band 16, and may include corresponding reference supports 46,48,50 to accurately reference the inner band in 3D space when supported right-side up therein.

The axial X-support 46 may include horizontal pins in an elevated wall in the cradle for laterally abutting the forward X-surface datum 36 of the box 24.

The radial Y-support 48 may include spaced cylindrical lands for abutting the radial Y-datum bottom perimeter 38 of the box 24 when resting thereatop.

The circumferential Z-support 50 may include a notch in an opposite elevated wall of the cradle for accurately receiving the circumferential Z-datum tab 40 from the flange 26.

A conventional electrical discharge machine (EDM) 52 may be used to accurately remove the vane stubs 42 and sequentially form suitable vane pockets or seats 54 joined together by a common mounting or access slot 56. The inner band 16 is machined using the reference datums 36,38,40 to accurately form and position the vane seats 54 therein.

Figure 6:
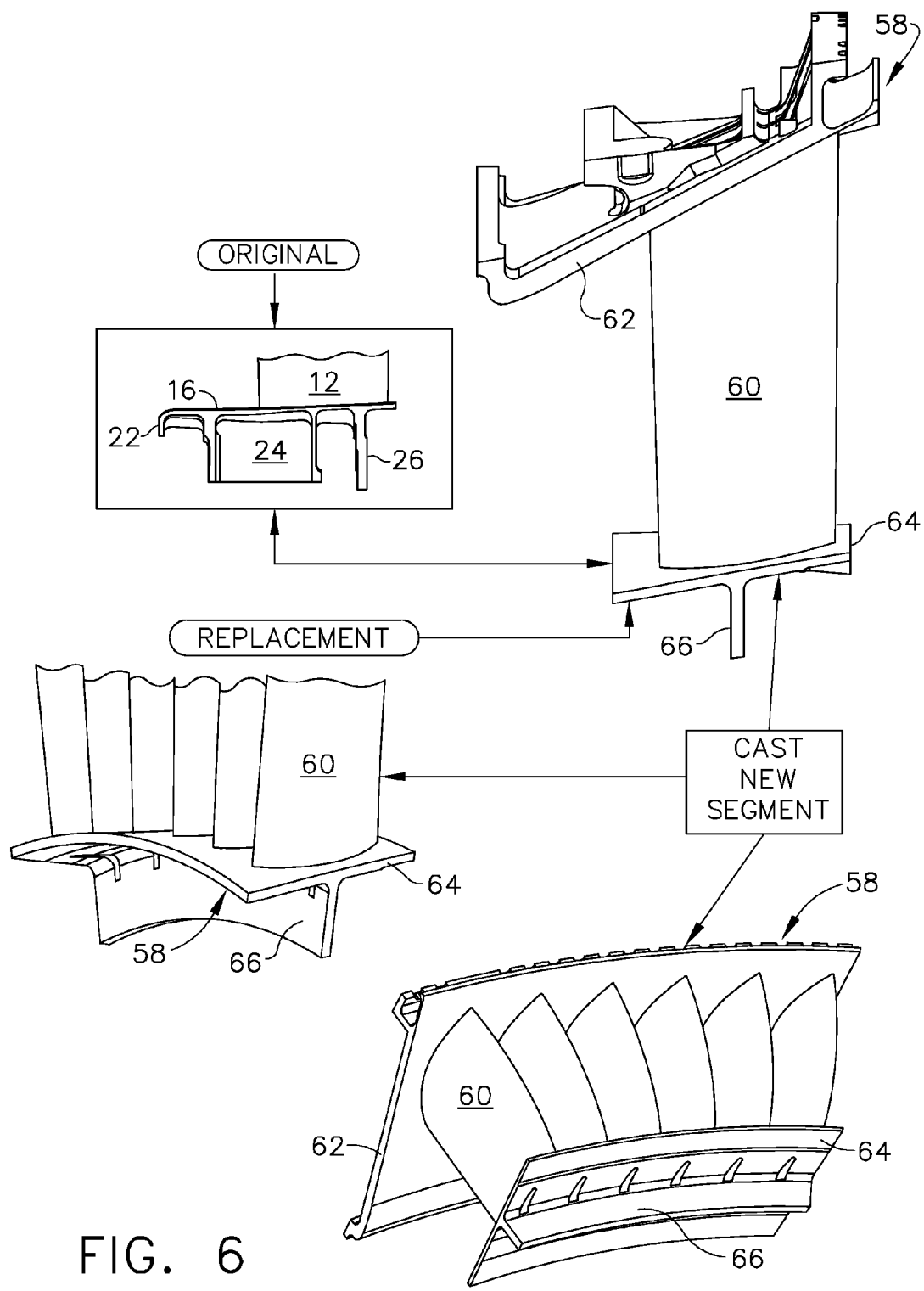
FIG. 6 is a flowchart illustrating casting of a replacement turbine nozzle segment including replacement nozzle vanes and outer band, and a special radially inner web.

FIG. 6 illustrates conventional casting of a specially configured replacement turbine nozzle 58.

The replacement nozzle 58 includes a plurality of nozzle vanes 60 extending radially between a new outer band 62 and a radially inner web 64 in a unitary or one-piece casting of conventional cobalt or nickel based superalloy metal with preferential metallurgical properties like directionally solidified grain structure or single crystal.

The replacement outer band 62 and vanes 60 conform or match identically with the original outer band 14 and vanes 12 within typical manufacturing tolerances of a few mils, but the new web 64 is configured differently than the original inner band 16 to simplify the repair method and reduce expense, while improving dimensional accuracy.

In particular, the web 64 extends the full circumferential length of the nozzle segment to provide inboard flow surfaces matching those of the original inner band 16, and accurately ties together the several vanes 60 in each segment.

In the exemplary embodiment illustrated in FIGS. 2 and 6, the original nozzle 10 includes a row of six (6) vanes in a unitary cast assembly with the outer and inner bands 14,16.

Likewise, the replacement nozzle 58 must be identical to include the same number and configuration of new vanes 60 accurately joined to the same configuration of the new outer band 62, with the web being intentionally differently configured from the original inner band 16.

In other embodiments, the nozzle may include two or more vanes per segment for repair under the procedures disclosed herein.

The web initially improves the casting process to accurately join together the several vanes 60 for accurately effecting the corresponding flow channels therebetween, which typically include a specified throat of minimum flow area at a specific axial location at or near the trailing edges of the vanes.

In addition, the special web 64 includes a special tie bar 66 integrally cast therewith which extends radially inwardly below the web and circumferentially along its full length.

The tie bar further increases the dimensional accuracy of the cast nozzle 58, and provides additional advantages in repairing the original nozzle 10.

As indicated above, the original inner band 16 is machined to accurately form the vane seats 54 therein.

Figure 7:
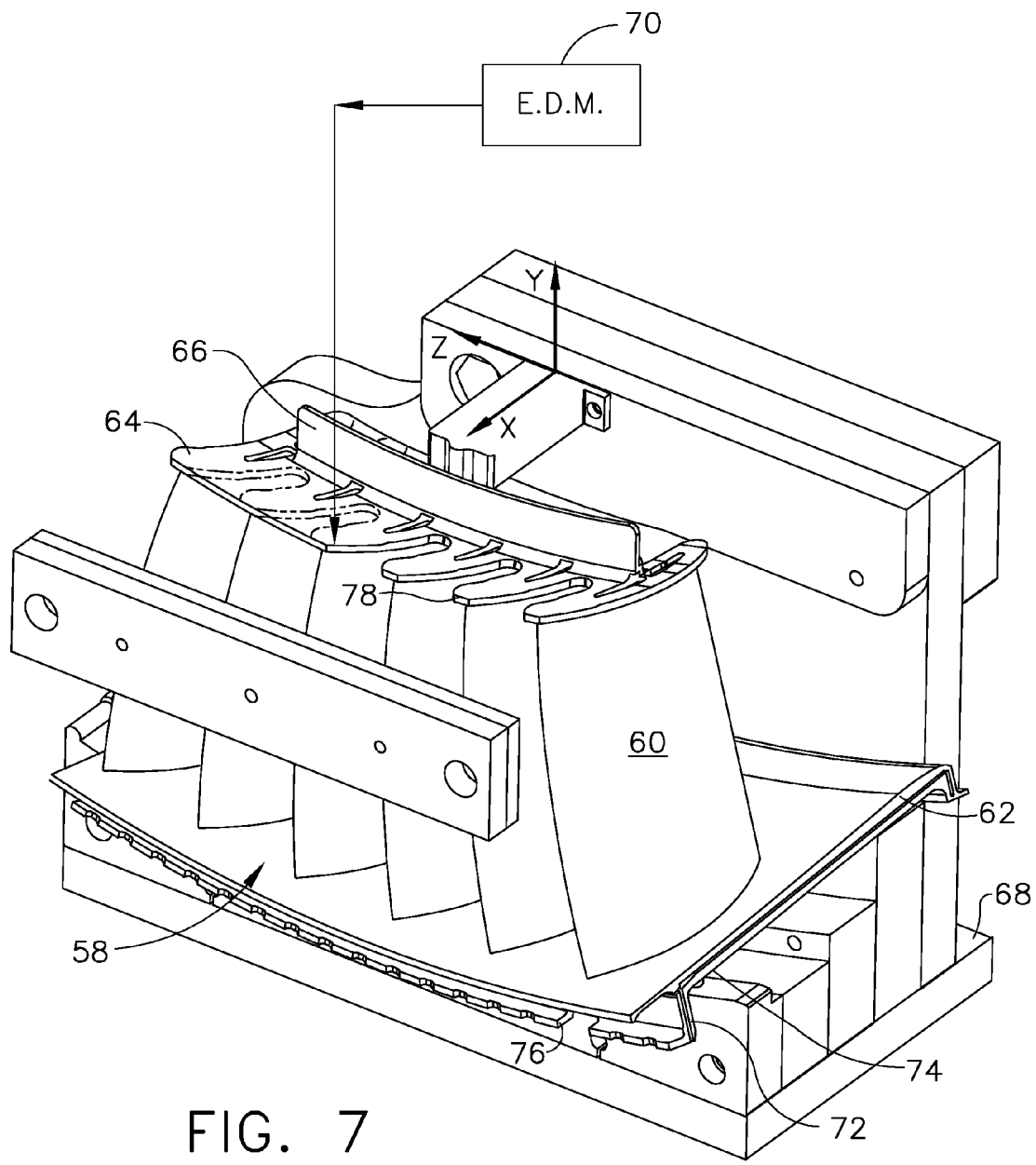
FIG. 7 is a flowchart illustrating machining of the special inner web.

Correspondingly, the new web 64 is machined as shown in FIG. 7 to conform with the machined or specially prepared used inner band 16 for subsequent assembly thereof to effect a biformed turbine nozzle repair including both new and old components.

In particular, a fourth tool or fixture 68 is provided to accurately support or position the replacement nozzle 58 in a conventional EDM machine 70.

As shown in FIG. 5 the original or old inner band 16 is specially machined to introduce accurate reference datums 36,38,40 in respective axial, radial, and circumferential surfaces.

Similarly, the replacement nozzle 58 is suitably machined to include accurate reference datums 72,74,76 in respective axial, radial, and circumferential surfaces in the new outer band 62.

The axial X-datum surface 72 may be the face of the aft radial flange in the outer band 62.

The radial Y-datum surface 74 may be on the outer surface of the outer band 62.

The circumferential Z-datum surface 76 may be a notch in the aft radial flange.

The replacement nozzle 58 may then be suitably mounted in the tool 68 for accurately machining respective vane-bases or plinths 78 atop or along the common tie bar 66 at each of the replacement vanes 60, with each plinth 78 specifically conforming with its respective vane seat 54.

Figure 8:
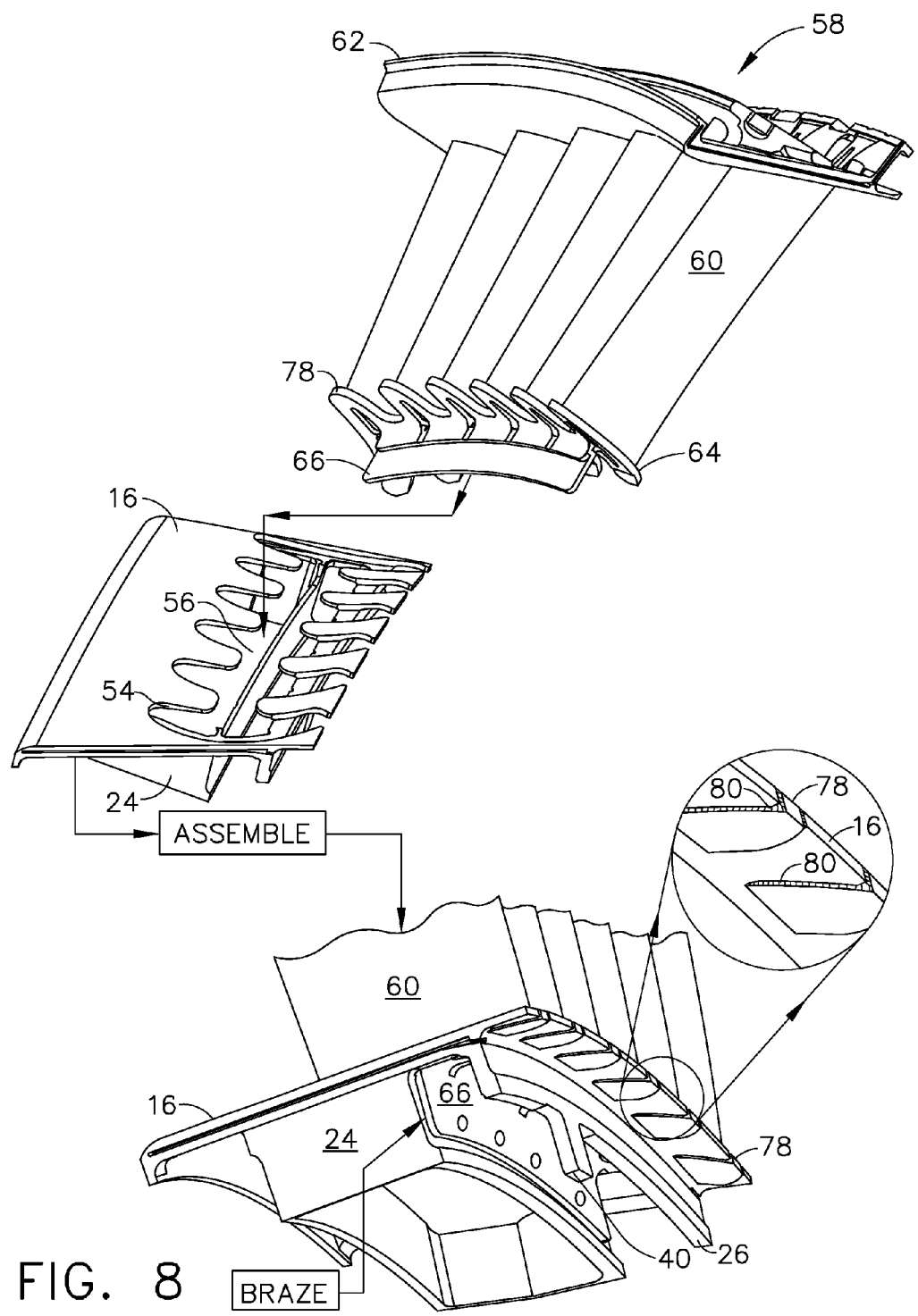
FIG. 8 is a flowchart illustrating assembly of the replacement turbine nozzle with the machined original inner band.
Figure 9:
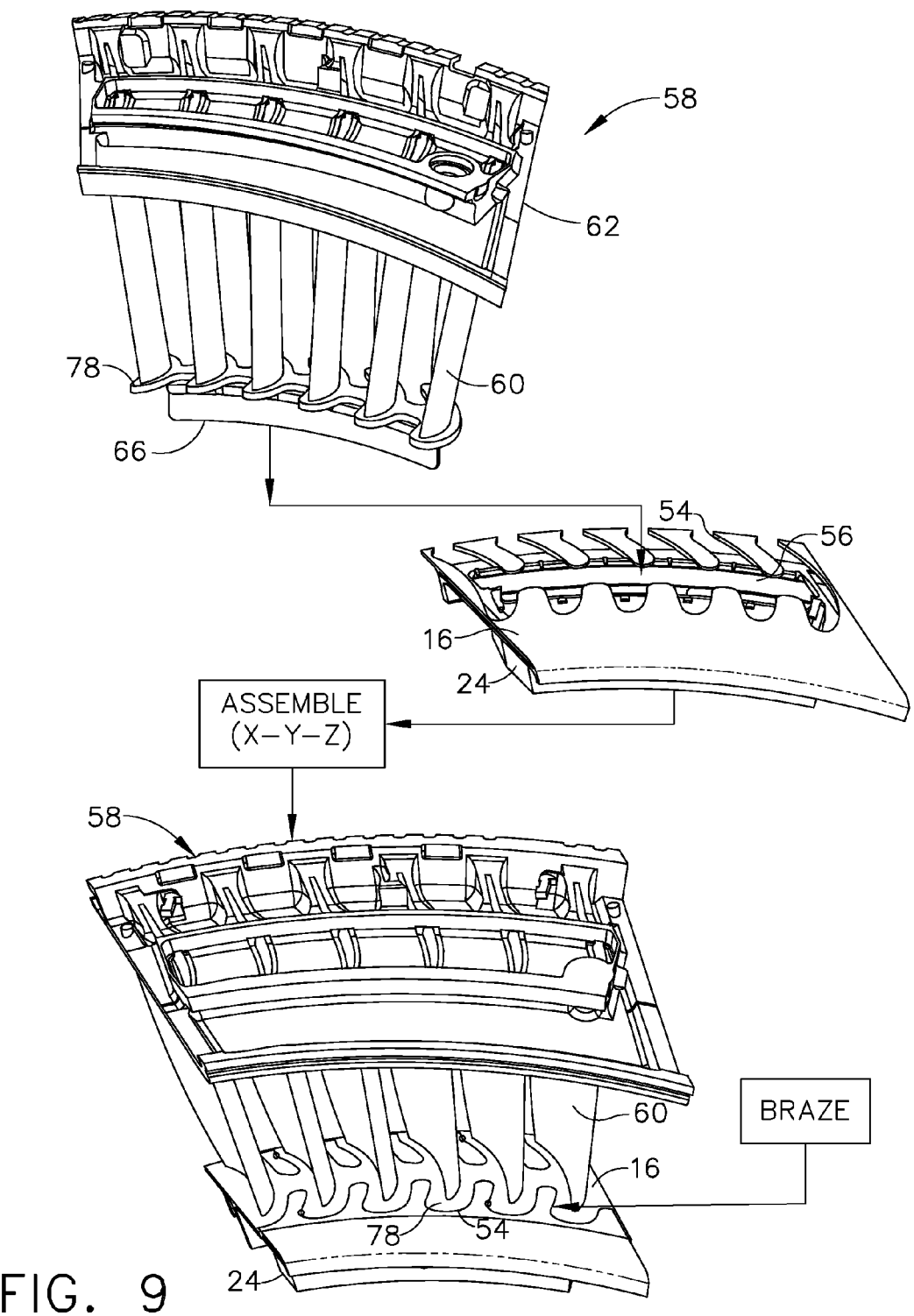
FIG. 9 is a flowchart, like FIG. 8, illustrating assembly and bonding together of the replacement turbine nozzle and repaired inner band.

FIGS. 8 and 9 illustrate final assembly of the prepared inner band 16 and correspondingly prepared replacement nozzle 58.

The several vane plinths 78 and common tie bar 66 are assembled together through the corresponding vane seats 54 in the original inner band 16 and aligned together in 3D space axially, radially, and circumferentially.

The machining tolerances for the vane seats 54 and plinths 78 can be as small as desired, less than several mils for example, to ensure accurate fit-up of the assembly. The repair assembly includes both the original inner band 16, as specially prepared, and the new vanes 60 and outer band 62 as precisely cast, along with the specially prepared mounting or mating plinths 78.

As shown by the four dots in FIG. 9, the plinths 78 may initially be tack welded to the inner band for maintaining accurate alignment therebetween, followed by suitable bonding, by brazing for example, into their corresponding vane seats 54 to integrally join the replacement nozzle to the original inner band along the tie bar 66.

The resulting repaired turbine nozzle is thusly biformed using in part the original inner band 16 and in part the new nozzle vanes 60 and outer band 62 all accurately assembled together due to the precise configurations and dimensions of the plinths 78 in their vane seats 54.

In this improved repair method, the replacement nozzle 58 is assembled to the old inner band 16 by aligning the plinths 78 in the seats 54 using the corresponding reference datums X-Y-Z in the inner band 16 and in the replacement nozzle 58.

The basic repair method for the original turbine nozzle 10 therefore includes:

severing the inner band from the vanes;

casting a replacement turbine nozzle including and outer bands and vanes conforming with the original outer bands and vanes, and further including the inner web integrally joining together the replacement vanes;

machining the inner band to form the vane seats and common mounting slot therein;

machining the web to form the respective plinths at each of the replacement vanes corresponding with the vane seats, while retaining the tie bar integrally joining together the replacement vanes;

assembling the replacement nozzle and inner band to position the plinths in the seats and position the tie bar inside the mounting slot; and bonding the plinths to the seats to integrally join together the inner band to the respective replacement vanes and outer band.

As shown in FIG. 4, each vane 12 has the typical airfoil or crescent shape including arcuate camber between the opposite leading and trailing edges thereof, and each vane must transition smoothly at its opposite root or support ends with the respective inner and outer bands that confine the combustion gases during operation.

Accordingly, the inner band 16 is suitably machined to separate circumferentially the vane seats 54 both forward and aft along the common mounting slot 56 as shown in FIG. 8 to match the complementary configuration of the machined vane plinths 78. The vane seats 54 are thusly separated from each other by original portions or fingers of the inner band.

Correspondingly, the web 64 is suitably machined to separate circumferentially the plinths 78 both forward and aft atop the common tie bar 66. The plinths 78 are thusly separated from each other by corresponding finger slots.

This machining of the seats 54 and plinths 78 may be conventionally effected using correspondingly shaped EDM electrode tools to plunge cut the respective pockets in the inner band 16 and web 64 and form the complex arcuate contours thereof.

The plinths 78 and tie bar 66 accurately conform with the vane seats 54 and mounting slot 56 within a few mils tolerance to smoothly blend the replacement vanes 60 to the adjoining flow surfaces of the original inner band 16 which surround the open seats 54 and slot 56.

The plinths 78 accurately form the integral root ends of the new vanes 60 and include correspondingly small transition fillets that blend the vanes to the original inner band 16 after assembly.

A significant feature of the repair process is that the new turbine nozzle 58 may use a considerably simpler web 64 without the complex features of the original inner band 16 since only portions of the web 64 are used in the repaired nozzle to complement the corresponding portions of the original inner band 16 being reused.

The replacement nozzle 58 is specifically configured for repairing the original nozzle 10, yet need not be as complex.

The replacement outer band 62 and replacement vanes 60 conform with or identically match the original outer band 14 and vanes 12, and are integrally joined to the common web 64 in a unitary or one-piece original casting.

The web 64 is configured more simply than the original inner band 16, with the inner band 16 including the plenum box 24 and the radial flange 26 below the original vanes 12 as shown in FIG. 6, and the web 64 does not include such box 24 and flange 26. Neither does the web require or include the original forward lip 22.

These substantial features of the original band add weight, complexity and cost, and are not required in the simpler web 64, which therefore reduces its cost.

The web 64 introduces the new radial tie bar 66 below the replacement vanes 60, whereas the original inner band 16 does not include such tie bar 66.

The material removed from the original band 16 to form the seats 54 and slot 56 is replaced by the material added by the plinths 78 and common web 64 therebetween.

The radial flange 26 and tie bar 66 are thusly differently configured and differently located for adjoining together in the replacement turbine nozzle for sharing complementary features from both the original inner band and the web to collectively form (biform) a replacement inner band conforming in configuration and dimensions with the original inner band 16, but with the introduction of the new tie bar 66 as shown in FIG. 8.

The tie bar 66 may be configured as small as practical for its special functions, and significantly smaller than the radial flange 26. And, the tie bar 66 is specially configured to adjoin and nest closely in a corresponding lateral seat formed in the aft side of the aft wall of the box 24 to form a strong mechanical bond therewith when brazed.

In FIG. 8 small witness holes are shown in the tie bar 66 to visually ensure that the braze material flows completely between the mating surfaces of the tie bar and plenum box.

As shown in FIG. 8 the vane seats 54 extend through the inner band 16 both forward and aft of the common mounting slot 56 to form a common open pocket therewith, under which the aft wall of the plenum box 24 is located.

The plinths 78, remaining web 64, and tie bar 66 are collectively seated in the vane seats 54 and slot 56, with the tie bar 66 being disposed in abutting adjacent contact with the aft pocket wall for being laterally bonded thereto.

The plinths and seats, and tie bar and box, create a collective interface or structural interlock between their 3D surfaces in which the braze metal may readily flow to collectively bond together these components in an integral and rigid assembly having substantial strength approaching that of the originally cast nozzle.

The new plinths 78 are laterally surrounded by the original inner band 16 at the vane seats; these plinths 78 also rest atop the aft wall of the underlying plenum box 24; and the new tie bar 66 laterally abuts the same aft wall of the box 24, with the collective interfaces therebetween being filled with braze material in a strongly bonded multifaceted joint.

As also shown in FIG. 8, the web 64 is preferably thicker than the original inner band 16 so that the web plinths 78 smoothly blend flush with the inboard flow side of the inner band 16 around the replacement vanes 60, yet can extend through the inner band to form a small under-band step which can be filled with the braze material in an exposed braze fillet 80.

The tie bar 66 is introduced in the new nozzle casting 58 to maintain accuracy of the nozzle flow channels between the new vanes 60, and the tie bar 66 is affixed in the original inner band 16 to maintain aerodynamic performance of the nozzle flow channels in the repaired nozzle in accordance with original design specifications.

To complete the repair process, additional material may be suitably applied, by brazing or welding for example, to the reference datums 36,38,40 to replace the material removed due to the premachining thereof, and thereby return the nozzle to its original configuration and dimensions in accordance with the original design specifications. New corrosion or thermal insulation coatings may then be reapplied to the repaired nozzle to replace such coatings previously used in the original nozzle, but removed for the repair process.

A new box cover 28 may be applied to the original box 24; and the so repaired turbine nozzle 58 may be returned to service.

The original inner band 16 of the worn turbine nozzle 10 may therefore be salvaged and reused in the new, replacement turbine nozzle 58 by this special repair method that preferentially matches the old band 16 to the new web 64, which collectively match the original configuration of the inner band 16 to ensure accurate dimensions and positions of the new vanes on the old band 16 for in turn matching aerodynamic performance of the turbine nozzle for its re-use in the gas turbine engine, and thereby achieving extended life.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A repair method comprising:
    severing an original inner band from a plurality of original nozzle vanes joined to an original outer band in an original turbine nozzle;
    casting a replacement turbine nozzle including a plurality of nozzle vanes extending between an outer band and an inner web, with said replacement outer band and vanes conforming with said original outer band and vanes, and said web is configured differently than said inner band to include a tie bar;
    machining said original inner band to form vane seats therein; and
    machining said web to form respective plinths atop said tie bar at each of said replacement vanes conforming with said vane seats;
    assembling said plinths and tie bar through said vane seats; and
    bonding together said plinths and vane seats to integrally join said replacement nozzle to said original inner band along said tie bar.

2. A method according to claim 1 further comprising:
    premachining said original nozzle to create a plurality of reference datums in said inner band; and
    machining said inner band using said reference datums to form said vane seats therein.

3. A method according to claim 2 wherein:
said inner band is severed from said original vanes to leave vane stubs thereatop;
said severed inner band is machined to remove said vane stubs and form said vane seats joined together by a common mounting slot; and
said replacement nozzle and machined inner band are assembled to position said tie bar inside said mounting slot.

4. A method according to claim 3 wherein:
said inner band is machined to separate said vane seats both forward and aft along said mounting slot;
said web is machined to separate said plinths both forward and aft atop said tie bar; and
said plinths and tie bar conform with said vane seats and mounting slot to smoothly blend said replacement vanes to an adjoining flow surface of said original inner band.

5. A method according to claim 4 further comprising assembling said replacement nozzle and inner band to align said plinths in said seats using said reference datums in said inner band and corresponding reference datums in said replacement nozzle.

6. A method according to claim 5 wherein said reference datums comprise respective axial, radial, and circumferential surfaces in both said original inner band and said replacement outer band to align together said plinths and vane seats axially, radially, and circumferentially.

7. A method according to claim 5 wherein:
said vane seats extend through said inner band both forward and aft of said mounting slot to form a common pocket therewith;
a plenum box includes an aft wall disposed below said mounting slot in said inner band; and
said plinths and tie bar are collectively seated in said vane seats and adjacent said aft wall, respectively, and collectively bonded together therewith.

8. A method according to claim 5 wherein:
said web is thicker than said inner band; and
said plinths smoothly blend flush with said inner band around said replacement vanes, and extend through said inner band in a common bond therewith.

9. A method according to claim 5 wherein:
said inner band includes a plenum box and radial flange, and said web does not; and
said tie bar is bonded to said box in said repaired nozzle spaced from said flange.

10. A method according to claim 9 wherein:
said plenum box includes a radial datum machined along a perimeter thereof, and an axial datum machined along a forward wall thereof; and
said radial flange includes a circumferential datum tab.

11. A method for repairing an original turbine nozzle including a plurality of nozzle vanes joined at opposite ends to outer and inner bands, comprising:
severing said inner band from said vanes;
casting a replacement turbine nozzle including an outer band and vanes conforming with said original outer band and vanes, and further including an inner web integrally joining together said replacement vanes;
machining said inner band to form vane seats therein;
machining said web to form respective plinths at each of said replacement vanes corresponding with said vane seats, while retaining a tie bar integrally joining together said replacement vanes;
assembling said replacement nozzle and inner band to position said plinths in said seats; and
bonding said plinths to said seats to integrally join together said inner band to said respective replacement vanes and outer band.

12. A method according to claim 11 further comprising:
premachining said original nozzle to create a plurality of reference datums in said inner band; and
machining said inner band using said reference datums to form said vane seats therein.

13. A method according to claim 12 wherein said reference datums comprise a radial datum under said inner band, an axial datum disposed perpendicular thereto, and a circumferential datum bridging said original vanes.

14. A method according to claim 12 wherein:
said inner band is severed from said original vanes to leave vane stubs thereatop;
said severed inner band is machined to remove said vane stubs and form said vane seats joined together by a common mounting slot; and
said replacement nozzle and machined inner band are assembled to position said tie bar inside said mounting slot.

15. A method according to claim 14 wherein:
said inner web includes said tie bar disposed below said replacement vanes, and said plinths are spaced apart forward and aft atop said tie bar; and
said inner band includes a wall disposed below said mounting slot, and said vane seats extend through said inner band both forward and aft of said mounting slot to form a common pocket therewith collectively seating said plinths and tie bar.

16. A method according to claim 15 wherein:
said plinths blend smoothly with said inner band around said replacement vanes, and extend through said inner band atop said wall in a common bond therewith; and
said tie bar is laterally bonded to said wall.

17. A method according to claim 14 wherein:
said inner band includes a plenum box and radial flange, and said web does not; and
said tie bar is bonded to said box in said repaired nozzle spaced from said flange.

18. A method according to claim 17 wherein:
said plenum box includes a radial datum machined along a perimeter thereof, and an axial datum machined along a forward wall thereof; and
said radial flange includes a circumferential datum tab.

19. A method according to claim 18 further comprising assembling said replacement nozzle and inner band to align said plinths in said seats using said reference datums in said inner band and corresponding reference datums in said replacement nozzle.

* * * * *